United States Patent [19]
Hirai et al.

[11] Patent Number: 5,999,753
[45] Date of Patent: Dec. 7, 1999

[54] SINGLE-LENS REFLEX CAMERA

[75] Inventors: Isamu Hirai; Shigeru Iwamoto, both of Tokyo, Japan

[73] Assignee: Asahi Kogaku Kogyo Kabushiki Kaisha, Tokyo, Japan

[21] Appl. No.: 09/016,429

[22] Filed: Jan. 30, 1998

[30] Foreign Application Priority Data

Jan. 30, 1997 [JP] Japan .................................. 9-016198

[51] Int. Cl.$^6$ ....................................................... G03B 7/20
[52] U.S. Cl. ........................................... 396/227; 396/239
[58] Field of Search ................................... 396/238, 239, 396/257, 258, 529, 532, 213, 227

[56] References Cited

U.S. PATENT DOCUMENTS

| | | | |
|---|---|---|---|
| 3,394,644 | 7/1968 | Ettischer ............................ | 396/529 X |
| 4,558,940 | 12/1985 | Tano et al. .............................. | 396/227 |
| 4,577,952 | 3/1986 | Urano et al. ............................. | 396/227 |
| 4,582,412 | 4/1986 | Wakabayashi .......................... | 396/238 |
| 4,623,234 | 11/1986 | Shimizu et al. ......................... | 396/227 |
| 4,912,498 | 3/1990 | Nakai et al. ............................ | 396/227 |
| 5,012,268 | 4/1991 | Hirai ...................................... | 396/227 |

FOREIGN PATENT DOCUMENTS 63-271239  11/1988  Japan .

OTHER PUBLICATIONS

An English Language Abstract of JP 63–271239.

Primary Examiner—W. B. Perkey
Attorney, Agent, or Firm—Greenblum & Bernstein, P.L.C.

[57] ABSTRACT

A single-lens reflex camera with a full-aperture metering part includes a lens having an automatic diaphragm part, a lens mount, and an information transmitting part for transmitting information for full-aperture metering error compensation, and a camera body having a lens mount attachment part to which the lens mount of the lens is detachably attached, information receiving part for receiving the information for full-aperture metering error compensation from the information transmitting part of the lens, and a mode setting part for selecting one of various exposure modes including an automatic exposure mode. When the information receiving part receives no information for full-aperture metering error compensation from the information transmitting part in a state where the lens is attached to the camera body, the mode setting part enables the automatic exposure mode to be set, and the automatic diaphragm part forcibly sets an aperture to a full-aperture condition.

6 Claims, 8 Drawing Sheets

SINGLE-LENS REFLEX CAMERA

BACKGROUND OF THE INVENTION

1. Field of the Invention

The present invention relates to an improvement of a single-lens reflex camera of the TTL full-aperture metering type with which the lens can be exchanged.

2. Description of the Related Art

Single-lens reflex cameras of the TTL full-aperture metering type with which the lens can be exchanged have been conventionally known.

FIG. 1 is a front view showing a camera body 1 of the single-lens reflex camera, and FIG. 2 is a top view showing the camera body 1. In FIG. 1, reference numeral 2 denotes a lens mount attachment part; 3, a shutter button; 4, a strobe housing part; and 5, a quick-return mirror. In FIG. 2, reference numeral 6 denotes a main power switch; 7, a liquid crystal type display part; and 8, a hot shoe.

A camera lens mount 9 shown in FIG. 3 is attached to the lens attachment part 2, and includes a camera lens 10, an aperture ring 11 and a driving force transmission mechanism (not shown) for focus drive of the camera lens 10. The camera lens mount 9 also includes a plurality of aperture blades 12 and six electric contact pins 9a to 9f. On the other hand, the lens mount attachment part 2 includes seven electric contact pins 2a to 2g, and five of those seven electric contacts 2a to 2g are connected to the electric contact pins 9a to 9e of the camera lens mount 9.

The camera body 1 thus organized is adaptable to various types of camera lens mounts 9 that are attached to the lens mount attachment part 2 of the camera body 1.

Table 1 shown below indicates the combinations of the full-aperture F No. and minimum F No. of the camera lens to be mounted onto the lens mount attachment part 2. The information on the full-aperture F No. and the minimum F No. is represented by the combinations of H (high) and L(low) levels of the electric contact pins 9a to 9e so that the full-aperture F No. (Fmin) and the minimum aperture F No. (Fmax) are given to the camera body 1 side. Among those electric contact pins 9a to 9e, for example, three electric contact pins 9a to 9c are allocated to the full-aperture F No. (Fmin) whereas two electric contact pins 9d and 9e are allocated to the minimum F No. (Fmax).

TABLE 1

|       | Fmax |   |   |   |   |   |   |   |
|-------|------|---|---|---|---|---|---|---|
|       | 2 | 1 | 2 | 1 | 2 | 1 | 2 | 1 |
|       |   |   |   | Fmin |   |   |   |   |
| 3 2 1 | H | H | L | L | L | H | H | L |
| L L L | NG | | 1.2–22 | | 1.7–32 | | 2.4–45 | |
| L L H | NG | | 1.4–22 | | 2–32 | | 2.8–45 | |
| L H L | 1.2–16 | | 1.7–22 | | 2.4–32 | | 3.5–45 | |
| L H H | 1.4–16 | | 2–22 | | 2.8–32 | | 4–45 | |
| H L L | 1.7–16 | | 2.4–22 | | 3.5–32 | | 4.5–45 | |
| H L H | 2–16 | | 2.8–22 | | 4–32 | | 5.6–45 | |
| H H L | 2.4–16 | | 3.5–22 | | 4.5–32 | | 6.7–45 | |
| H H H | 2.8–16 | | 4–22 | | 5.6–32 | | 8–45 | |

The camera lens mount 9 also includes an aperture linking rod 13 that is rotated by the aperture ring 11, and the lens mount attachment part 2 also includes a coupled rod 14 that engages with the aperture linking rod 13. The camera is designed in such a manner that a resistance AVVR of a volume (not shown) changes with the movement of the coupled rod 14, and that a change of the resistance AVVR of the volume is detected to detect the aperture value equivalent of the camera lens. The aperture blades 12 are constantly urged in the minimum aperture direction by a spring means (not shown) disposed inside of the camera lens mount 9 in such manner that when the aperture ring 11 is at a position "A", the aperture blades 12 are in a minimum aperture state in the condition where the camera lens mount 9 is removed from the camera body 1.

Numerical values indicative of the F Nos. corresponding to the aperture values are marked at each of predetermined angles on the aperture ring 11, and symbol "A" indicative of control at the camera body side is marked at a position past the minimum aperture value in the direction along which the aperture ring 11 is rotated. The lens attachment part 2 also includes an engaging lever 16 that engages with a rotating lever 15 of the camera lens mount 9 in such a manner that the aperture blades 12 are rotated by the rotation of the rotating lever 15. When the camera lens mount 9 is rotated after the camera lens mount 9 is attached onto the lens mount attachment part 2, the rotating lever 15 engages with the engaging lever 16, and when the camera lens mount 9 is further rotated in the same direction, the rotating lever 15 is rotated in the full-aperture direction so that when the camera lens mount 9 is set in the lens mount attachment part 2, the aperture blades 12 becomes in the full-aperture condition.

When in the condition where the camera lens mount 9 has been attached onto the camera body 1, the aperture ring 11 is rotated in a direction indicated by an arrow Q from the position "A" indicative of control at the camera side to a position "M" indicative of control at the lens side, that is, toward the position marked with the numeric values indicative of the full-aperture F No., the aperture linking rod 13 is rotated so that the coupling rod 14 is rotated in accompaniment, to thereby change the resistance AVVR of the volume. As a result, the aperture value equivalent is transmitted as described above. In this example, if the aperture ring 11 is positioned at the position "A", the electric contact 9f changes from "H" to "L" in level, to thereby transmit the information indicating that the lens is at the position "A" to the camera body 1.

When the aperture ring 11 is rotated in the angular range corresponding to the numerals indicative of the F Nos. and then set manually to a desired aperture value in a state where the camera lens mount 9 has been removed from the camera body 1, the aperture blades 12 is rotated according to the rotation of the aperture ring 11, to thereby set the aperture blades 12 to an opening angle corresponding to the desired aperture value.

In the single-lens reflex camera thus organized, a metering switch is turned on so that metering is performed in the full-aperture condition when the shutter button 3 is depressed halfway. If an automatic exposure mode has been selected, calculations related to automatic exposure are executed according to an aperture-priority mode, a shutter-speed-priority mode, a program-priority mode or other modes.

For example, when a standard lens (with an F No. of 1.4 and focal length of 50 mm) is mounted onto the camera body 1 under the conditions where the aperture-priority mode is set, the exposure value is Ev, the metering output is Bv, the film sensitivity is Sv, and the aperture value is Av, the shutter speed Tv is calculated in principle by the following equation.

$$Ev = Bv + Sv = Av + Tv$$

If a lens other than the standard lens is mounted onto the camera body 1, the metering output Bv determined for a subject of a certain luminance through the standard lens differs from the metering output Bv determined for a subject of the same luminance when the lens other than the standard lens is mounted because the full-aperture F No. values differ between those two lenses. To give this difference in metering output as compensation information, the conventional device is designed such that an angle from the full-aperture position is shifted as shown in Table 2, and only angle information is transmitted to the camera body side.

TABLE 2

| A | 9 | 8 | 7 | 6 | 5 | 4 | 3 | 2 | 1 | | Av scale |
|---|---|---|---|---|---|---|---|---|---|---|---|
| A | 22 | 16 | 11 | 8 | 5.6 | 4 | 2.8 | 2 | 1.4 | | F No. Standard lens (1.4/50) |
| | | | A | 22 | 16 | 11 | 8 | 5.6 | 4 | 2.8 | F No. Arbitrary lens (2.8/100) |
| ......| | | | | | | | | | | Full-aperture position |
| Amount of compensation for full-aperture metering error | | | | | | | | | | | |

Table 2 indicates a case where a lens with an F No. of 2.8 and focal length of 100 mm is mounted, for example, as an arbitrary other lens shown in Table 1. For example, when the full-aperture F No. of the arbitrary lens is selected to be "8", the calculation described above is executed upon deeming that the full-aperture F No. 4 was selected with the standard lens.

This arrangement is convenient in that compensation can be performed for each lens other than the standard lens by interlocking with an aperture setting member without transmission of the full-aperture metering output error information as independent information to the camber body 1. That is, when the lens mount 9 of each lens is attached onto the mount attachment part 2, the full-aperture metering error information can be compensated by only the angle information (resistance AVVR).

In recent years, a new type of camera is being developed with which the characteristic information on the lens characteristics (full-aperture F No., minimum aperture value information, focal length information, full-aperture metering error information, etc.) are transmitted to the camera body only by a communication means. Although the volume is abolished in this new type of camera, when an old type of lens adapted to the old type of camera with a volume and having no communication means is mounted, it is impossible to obtain the full-aperture metering error information as angle information, with the results that the metering error occurs, and an appropriate exposure is not obtained when photography is performed in the automatic exposure mode.

In the case where a new type of lens adapted to the new type of camera is mounted on the camera of the old type, and the new type of lens has no aperture linking rod, no full-aperture metering error information likewise is provided as angle information, with the results that a metering error occurs, and no appropriate exposure is obtained when photograph is performed in the automatic exposure mode.

In those cases, an exposure error occurs with the new type of camera if photography in the automatic exposure mode is carried out with the control at the camera body side being set to the automatic exposure mode and the position of the aperture ring of the lens side being set to a position (position "M") other than the position "A" that signifies control at the camera body side. Thus, measures must be taken to disable selection of the automatic exposure mode or to cancel the selection of the automatic exposure mode or perform release lock if the automatic exposure mode is selected, etc. However, for a user, it is preferable in terms of ease of use to be able to execute photography in the automatic exposure mode.

SUMMARY OF THE INVENTION

The present invention has been made in view of the above circumstances, and therefore an object of the present invention is to provide a single-lens reflex camera with which an automatic exposure mode can be selected at a camera body side, and photography in the automatic exposure mode can be executed upon forcibly setting an aperture to a full-aperture condition when full-aperture metering error compensation information cannot be obtained and specially when information indicating that the aperture is controlled at the lens side is transmitted from the lens side to the camera body side.

To achieve the above object, according to a first aspect of the present invention, there is provided a single-lens reflex camera with a full-aperture metering means and with which, when a lens having an automatic diaphragm means is mounted onto the camera body and the information for full-aperture metering error compensation is not transmitted from the lens side to the camera body side, the automatic exposure mode can be selected at the camera body side, and photography can be executed with the aperture being forcibly set to the full-aperture condition.

According to a second aspect of the present invention, there is provided a single-lens reflex camera with a full-aperture metering means and with which, when a lens having an automatic diaphragm is mounted on the camera body and the information on control of the aperture at the lens side is transmitted from the lens side to the camera body side, the automatic exposure mode can be selected at the camera body side and photography can be executed with the aperture being forcibly set to the full-aperture condition.

According to a third aspect of the present invention, there is provided a single-lens reflex camera as set forth in the first or second aspect of the invention, wherein when the aperture is forcibly set to the full-aperture condition, a display that differs from that for normal aperture-priority control is displayed at the display part.

According to a fourth aspect of the present invention, there is provided a single-lens reflex camera as set forth in the first or second aspect of the invention, wherein when the aperture is forcibly set to the full-aperture condition, it is judged whether the lens mounted on the camera body has the full-aperture F No. information, and if the lens has the full-aperture F No. information, this full-aperture F No. information is displayed at the display part while if the lens does not have the full-aperture F No. information, either the display of the full-aperture F No. information is prohibited or information other than a numerical value that signifies the F No. is displayed.

BRIEF DESCRIPTION OF THE DRAWINGS

Other features and advantages of the present invention will be made more apparently by the detailed description hereunder taken in conjunction with the accompanying drawings, wherein.

DETAILED DESCRIPTION OF THE PREFERRED EMBODIMENTS

Now, a description will be given in more detail of preferred embodiments of the present invention with reference to the accompanying drawings.

Figure 1:
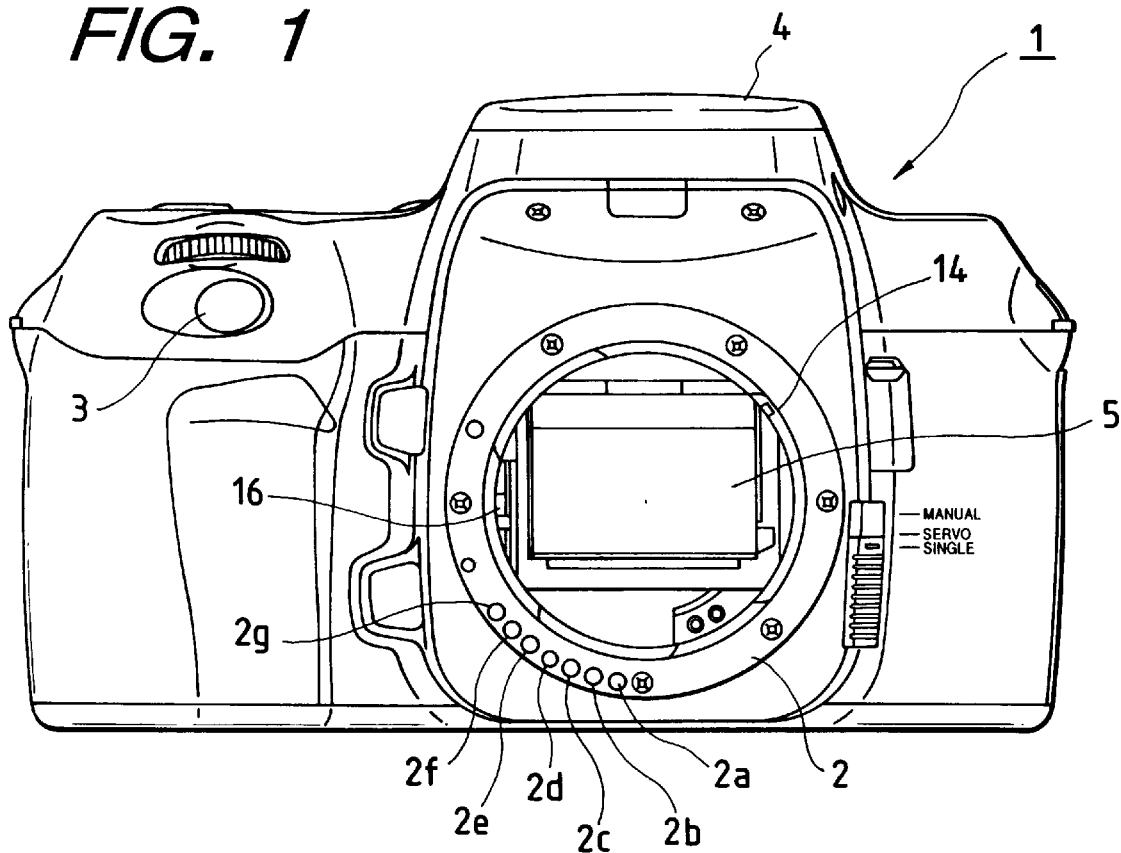
FIG. 1 is a front view showing a camera body of a single-lens reflex camera.
Figure 2:
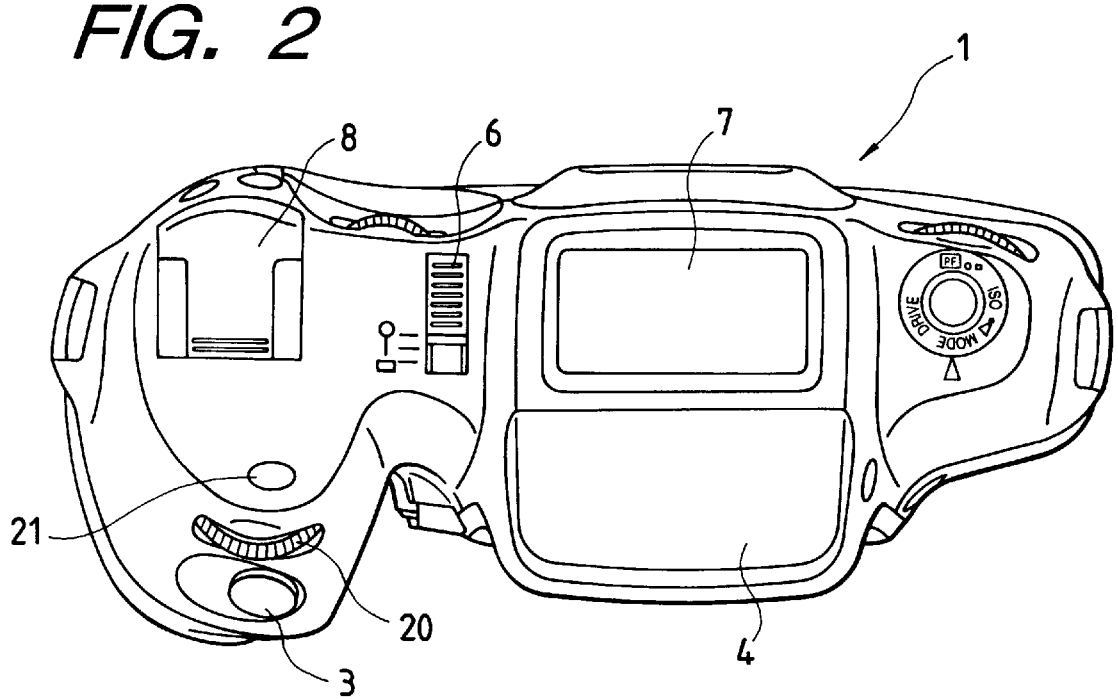
FIG. 2 is a top view showing the camera body of the single-lens reflex camera shown in FIG. 1.
Figure 3:
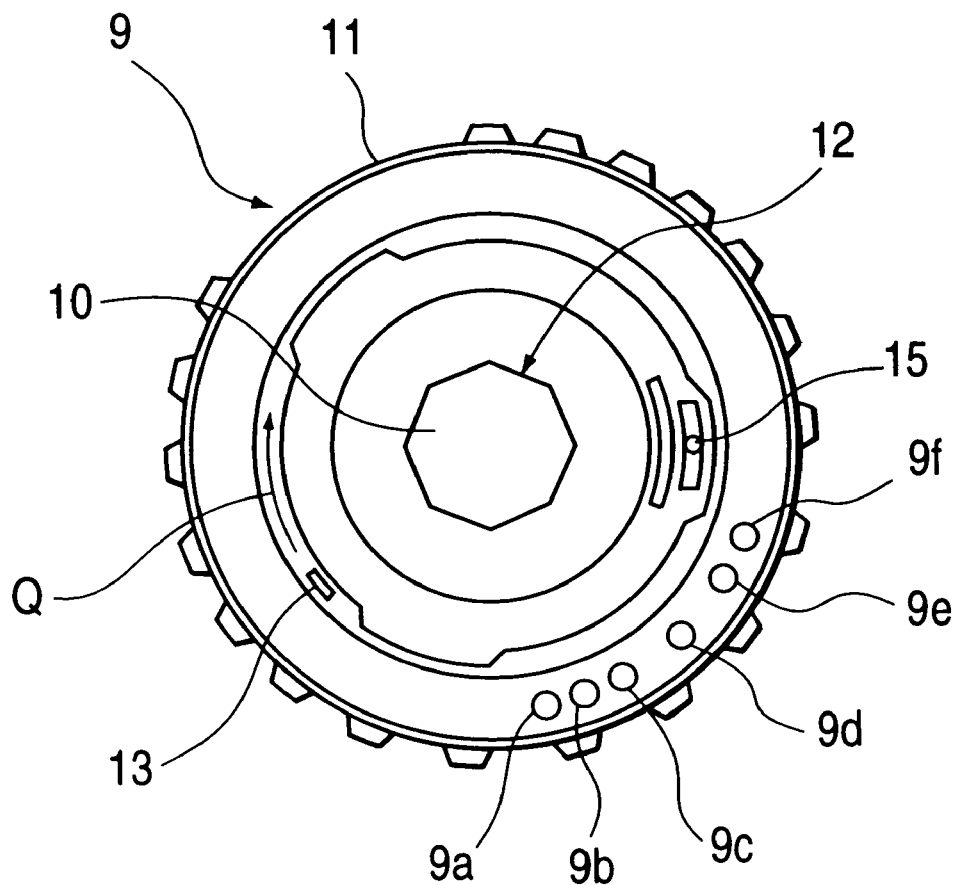
FIG. 3 is a plan view showing a lens mount to be attached onto the camera body of FIG. 1 as viewed from the camera body side.
Figure 4:
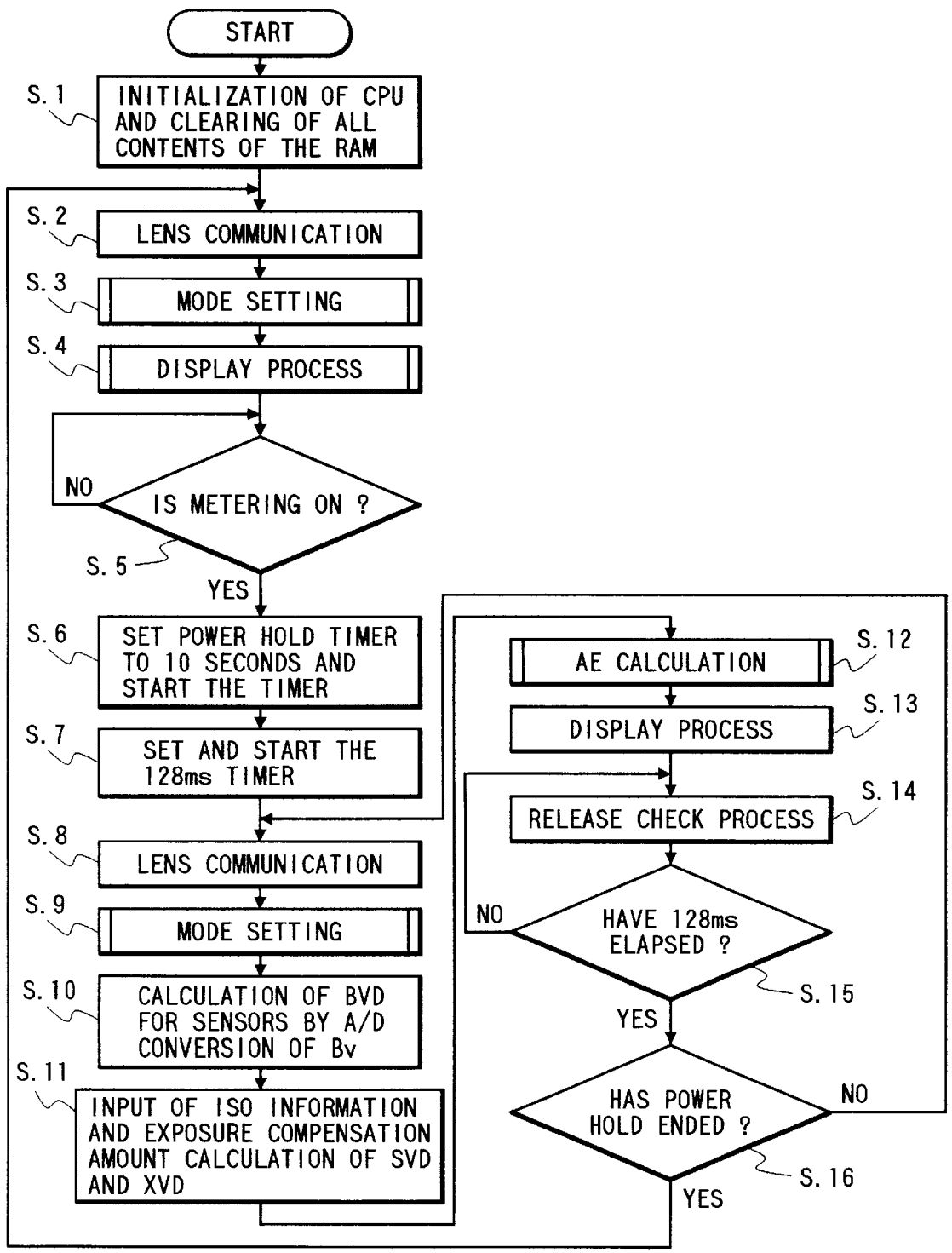
FIG. 4 is a flowchart showing the main operation of the single-lens reflex camera according to the invention.

FIG. 4 is a flowchart showing main operation of a single-lens reflex camera according to the present invention. In this example, a camera body 1 is of a new type having no volume, and an F lens, A lens or K lens can be mounted on the camera body 1 as a lens mount 9. The F lens means a lens where a CPU and a ROM are provided on the lens mount 9 so that characteristic information on the lens characteristics (full-aperture F No. information, minimum aperture value information, focal length information, full-aperture metering error information, etc.) are stored in the ROM, the lens aperture can be switched in position between positions A and M, and the lens characteristic information are transmitted to the camera body 1 only through a communication means. The A lens means a lens where the characteristic information on the lens characteristics (full-aperture F No. information, minimum aperture value information) are transmitted to the camera body 1 side through the electrical contacts 9a to 9e as shown in FIG. 3, and the lens aperture can be switched in position between the positions A and M. The K lens means a lens where the aperture can be set only at the lens side, that is, a lens that cannot transmit the control allocation information on whether the aperture is to be controlled at the lens side or at the camera body 1 side (put in another way, the k lens is a lens where the aperture cannot be set to the position "A").

When a main switch 6 is turned on, the CPU is initialized, and the entire contents of the RAM are cleared (S.1). If the new type of lens has been mounted, communication of information will then be performed between the camera body 1 and the lens mount 9 that has been attached onto the camera body 1 (S.2).

Figure 5:
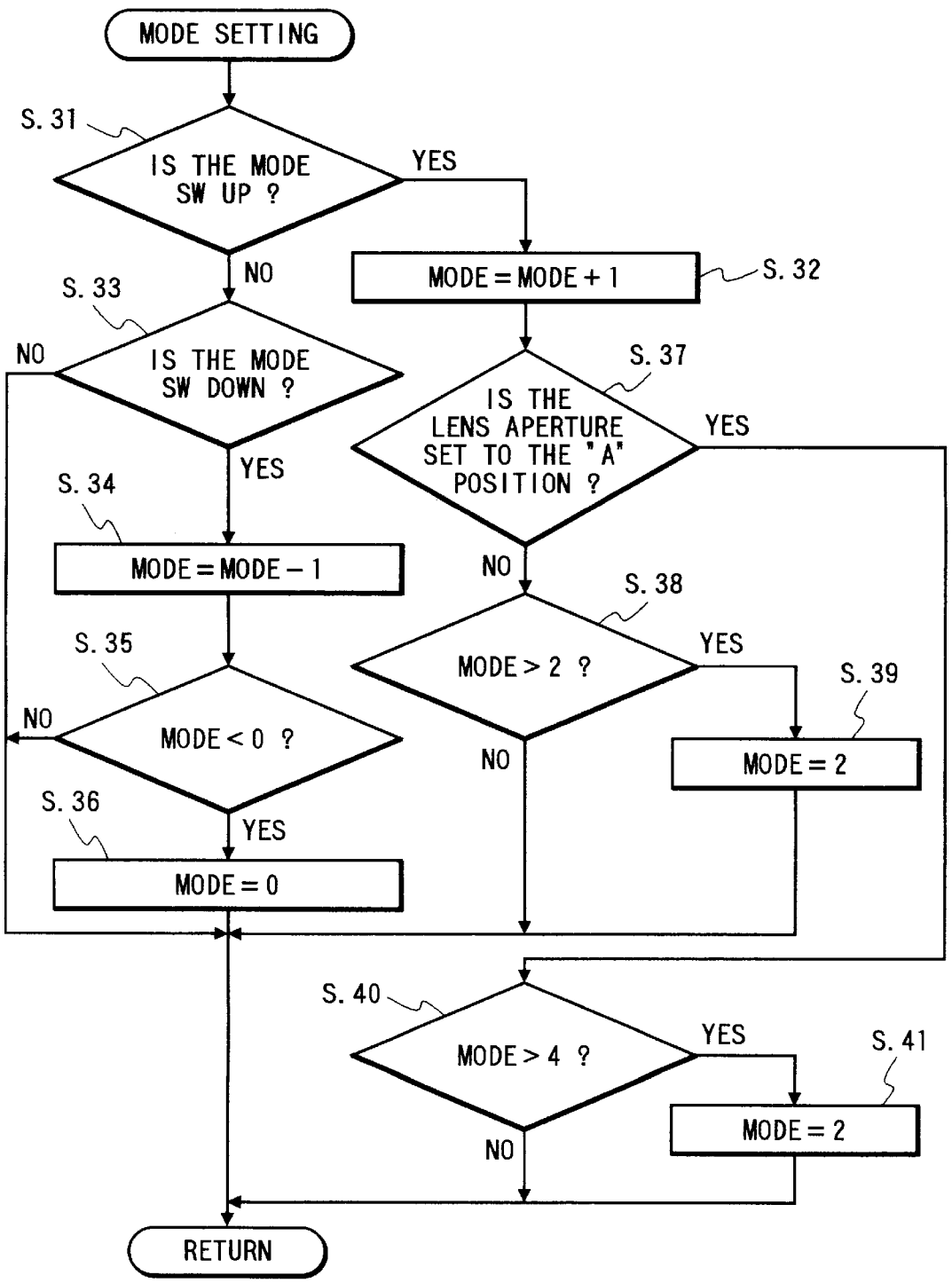
FIG. 5 is a flowchart showing a mode setting process of the single-lens reflex camera according to the invention.

In the lens communication, the camera lens focal length information, full-aperture value (AVMIN), full-aperture metering error compensation value (MV'), marginal lumination compensation value (NV'), and other characteristic information on the lens characteristics are sent to the camera body 1 side. The mode setting process is subsequently performed (S.3). This mode setting process is performed according to a flowchart shown in FIG. 5.

In this mode setting process, it is first judged whether or not a mode change switch 20 has been operated toward the UP side (S.31). If yes ("Y"), "+1" is added to a value in mode counter MODE (S.32), and if no ("N"), it is then judged whether or not the mode change switch 20 has been operated toward the DOWN side (S.33). If the result at S.33 is "Y", "−1" is added to a value in mode counter MODE (S.34), and it is then judged whether or not the value in mode counter MODE is "less than 0" (S.35). If the value in mode counter MODE is found to be "less than 0" at S.35 (if the result at S.35 is "Y"), the value in mode counter MODE is set to "0" (S.36), and a return to the main flow is performed. If the result at S.35 is "N", the return to the main flow is performed upon skipping S.36. If the result at S.33 is "N", the return to the main flow is performed upon skipping the processes of S.34, S.35 and S.36. As a result, the camera body 1 side is set to a bulb (Bulb) mode.

After carrying out the process of S.32, the CPU judges whether or not the lens aperture is set to the position "A" (whether or not the aperture ring 11 is set to the position "A") (S.37). If the aperture ring 11 is not at the position "A", that is, if it is set at a position "M" that signifies that control is to be performed not at the camera body 1 side but at the lens side, the CPU makes the "N" judgment, and S.38 is entered. In S.38, the CPU judges whether or not the value in mode counter MODE is greater than "2". If the result at S.38 is "N", a return to the main flow is performed. The value in mode counter MODE is thus set to "1", and the camera body 1 side is set to a manual (MANUAL) mode.

If the result at S.38 is "Y", the value in mode counter MODE is set to "2" (S.39), and a return to the main flow is then performed. By performing the process of S.39 by the CPU, the mode is set in which the automatic exposure mode can be selected at the camera body 1 side, and photography can be performed with the aperture being forcibly set to the full-aperture condition when a lens with an automatic diaphragm means is mounted on the camera body 1, and information on control of the aperture at the lens side is transmitted from the lens side to the camera body 1 side. The details of this mode will be described later.

If the result at S.37 is "Y", S.40 is entered so that it is judged whether or not the value in mode counter MODE is greater than "4". If the result at S.40 is "N", a return to the main flow is performed. If the value in the mode counter is "1", the value in mode counter MODE is "2" after the processes of S. 32, S.37 and S.40 have been executed, and the camera body 1 side is thus set to the Av-priority (aperture-priority) mode. If the value in the mode counter is "2", the value in mode counter MODE is "3" after the process of S.32, S.37 and S.40 have been executed, and the camera body 1 side is then set to a Tv-priority (shutter-speed-priority) mode.

If the result of S.40 is "Y", the CPU moves to S.41, sets the value in mode counter MODE to "4", and then performs a return to the main flow. The camera body 1 side is thus set to the program-priority (PROGRAM-priority) mode.

Table 3 shows correspondence between the MODE values and the respective modes.

TABLE 3

| MODE | 0 | 1 | 2 | 3 | 4 |
|---|---|---|---|---|---|
| Lens aperture A | Bulb | MANUAL | Av-priority | Tv-priority | PROGRAM |
| Lens aperture M | Bulb | MANUAL | Full-aperture Av-priority | — | — |

Next, the CPU performs the process for making the aperture value information (Av), shutter speed value information (Tv), and whether the control mode at the camera body side is set to the bulb mode (mode 0), manual mode (mode 1), Av-priority mode (mode 2), Tv-priority mode (mode 3) or program-priority mode (mode 4) be displayed at the liquid crystal type display part 7 (S.4). This display process will be described later.

Thereafter, it is judged whether or not the shutter button 3 has been depressed halfway so that the metering switch has been turned on (S.5). If metering has not been performed, the CPU standbys in this state. If metering has been performed, a power hold timer is set to 10 seconds (S.6) and started. A 128 mS timer is also set and started (S.7), and after the lens communication process (S.8) has been performed, the mode setting process is entered again (S.9). This mode setting process is entered again (S.9). This mode setting process is executed according to the flowchart of FIG. 5 as described above. The metering data BVD for each metering sensor to be described below is determined by A/D conversion of the metering output (S.10). The ISO information and exposure compensation quantity are inputted to the CPU so that the sensitivity data SVD and exposure compensation data XVD are calculated (S.11).

Figure 6:
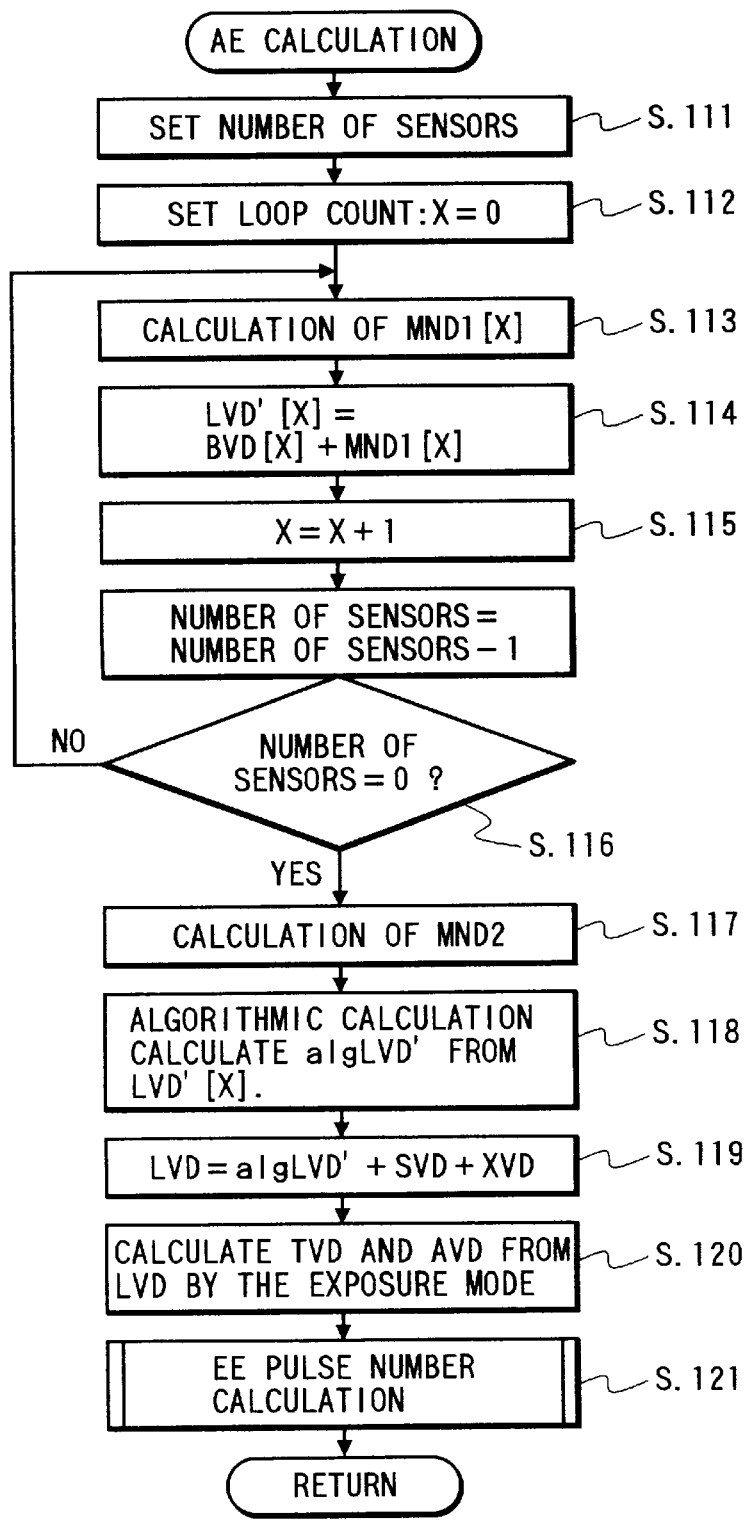
FIG. 6 is a flowchart showing an AE calculation process of the single-lens reflex camera according to the invention.

The CPU then executes the AE calculation process (S.12). This calculation process is executed according to the flowchart shown in FIG. 6.

This AE calculation process is basically performed according to the following calculation equation:

$$LVD=BVD+SVD+XVD+MND1$$

where, LVD is the light value data, and MND1 is the full-aperture metering compensation data obtained using the communication data.

Since a plurality of metering sensors are actually provided and their average value is used, the calculation of LVD'= BVD+MND1 is performed first.

In the case where the F lens is mounted on the new type camera:

$$MND1=MV2+MV3+MV\ 4+MV5+AVMIN-NV'-KSV$$

$$MND2=AVMIN+MV'+NV'-2$$

where MV2 is exit pupil position data, MV3 is vignetting data, MV4 is minimum F No. data, MV5 is a calculated metering compensation value determined according to focal length data, AVMIN is an APEX value of the full-aperture F No., MV' is a modification value for full-aperture metering error compensation, NV' is a marginal lumination compensation value, KSV is a compensation value that is set so that MND1 becomes "0" when a lens of "F No. 1.4–50 is mounted as the standard lens to the new type camera body 1, and MND2 is full-aperture metering error compensation data for the conventional, old-type camera that does not use communication data. Although the MND2 is used in total amount compensation for the new system and does away with the convention system, these are well known and their details will be omitted (refer to, for example, Japanese laid-open patent publication No. Sho 63-271239).

Also, when the old-type A lens is mounted on the new-type camera:

$$MND1=ADFINMIN+AVSMIN-\%$$

Since communication data are not used in case of the old-type A lens:

MND2=MND1.

The new-type camera is arranged so that electric contact information is transmitted when an old-type lens mount is attached onto the new-type camera.

When a X lens is mounted onto the new-type camera, since there is no full-aperture error compensation data:

MND1=0 and

MND2=0.

AVSMIN is equal to 1.

In the AE calculation process, the CPU first sets the number of sensors (S.111), sets a loop count X to "0" (S.112), and then calculates MD1[X] (S.113). The CPU then performs the calculation of LVD'[X]=BVD[X]+MND1[X] (S.114).

After performing this process, the CPU adds "+1" to the loop count value X (S.115) and performs the process of "the number of sensors=the number of sensors−1 (S.115a). The CPU then repeats the processes from S. 113 to S.116 until the number of sensors becomes "0". As a result, LVD'[X] is obtained for each sensor [X] (from X=0 to X=n).

After determining LVD'[X] for each sensor [X], the CPU calculates MND2 (S.117). The CPU then performs an algorithmic calculation to determine algLVD' from LVD'[X] (S.118).

Subsequently, the CPU calculates LVD from the algLVD' that is determined and using the following equation (S. 119):

$$LVD=agLVD'+SVD+XVD$$

TVD and AVD are then calculated from LVD according to the exposure mode (S.120).

If the lens mount 9 of an F lens or an A lens is attached onto the camera body 1, and the lens aperture is set to the position "A", the ordinary process that is well known, and the detailed explanation of which will therefore be omitted is executed.

If an F lens is mounted onto the new-type camera, and the lens aperture is set to a position "M", and the Av mode is selected, the shutter speed Tv is then calculated from TVD= LVD−AVDMIN−C1.

If an A lens is mounted onto the new-type camera, the lens aperture is set to a position "M" and the Av mode is selected, the shutter speed Tv is calculated according to TVD=LVD− AVDMIN−C2.

Also, AVDMIN=AVPINMIN+8⅛
where the term "8⅛" is due to AVD being defined as AVD=Av+8 ⅛.

Furthermore, if a K lens for which the lens aperture can only be positioned to the position "M" is mounted onto the new type camera, and the Av mode is selected, the shutter speed Tv is calculated according TVD=LVD−AVDSMIN− C3,
where AVDSMIN=AVSMIN+8 ⅛.

As described above, AVSMIN is "1".

In case of the K lens, the full-aperture metering error compensation data cannot be obtained, and the determined LVD itself is used for the calculation of the shutter speed Tv.

C1, C2 and C3 are compensation quantities.

Then, an EE pulse number calculation process is entered (S.121).

Figure 7:
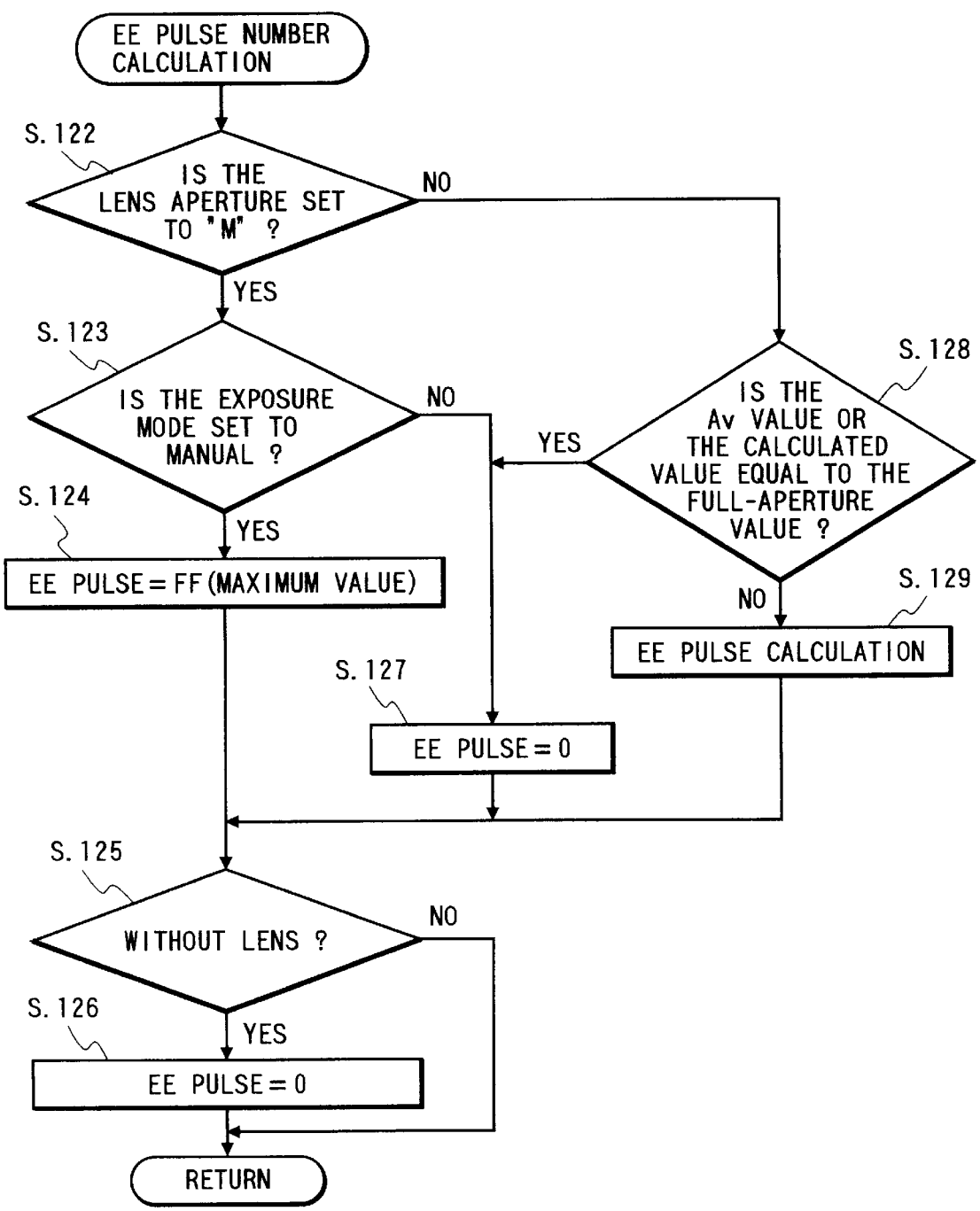
FIG. 7 is a flowchart showing an EE pulse calculation process of the single-lens reflex camera according to the invention.

The EE pulse number calculation process is executed according to the flowchart shown in FIG. 7.

In the EE pulse number calculation process, it is first judged whether or not the lens aperture is set to the position "M" in S.122. If the judgment result is "Y", it is judged whether or not the exposure mode at the camera body 1 side is set to manual (S.123). If the result at S.123 is "Y", FF (maximum value) is set as the number of EE pulses (S.124).

The reason why FF (maximum value) is set here as the number of EE pulses will be now explained.

That is, the above is done so that rotating lever 15 is rotated to a position corresponding to the aperture value set by aperture ring 11 and the aperture blades is stopped down to a value to which the aperture has been set manually.

Subsequently, it is judged whether or not the lens mount 9 is mounted on the camera body 1 (S.125). If it has been judged that the lens mount 9 is not mounted on the camera body 1 in S.125 (if the judgment result is "Y"), FF (maximum value) is set as the number of EE pulses (S.126). A return to the main flow is then performed. If it has been judged in S.125 that the lens mount 9 is mounted on the camera body 1, a return to the main flow is performed upon skipping S.126.

If the CPU judges that the exposure mode at the camera body 1 side is not manual ("N" judgment) in S.123, it moves on to S.127. In S.127, "0" is set as the number of EE pulses.

The reason for setting "0" as the number of EE pulses will be now explained.

The above is done to fix the aperture as the maximum full-aperture position. That is, the camera is arranged so that when photography is executed (when the shutter is released), the CPU counts the number of EE pulses generated by the stopping-down operation, judges whether or not the EE pulse count that has been counted matches the number of EE pulses determined by calculation, and causes engaging lever 16 to be latched by an aperture control magnet to prevent rotation of rotating lever 15 at a point where the count of EE pulses generated by the stopping-down operation matches the number of EE pulses determined by calculation. Therefore, the aperture is fixed at the full-aperture position when "0" is set as the number of EE pulses.

Thus, when the lens aperture is set to the position "M", and the mode at which the camera body side is set to the automatic exposure mode, photography can be executed with the aperture being forcibly set to the full-aperture condition regardless of whether an F lens, A lens or K lens is mounted.

At S.122, the CPU makes the "N" judgment if the lens aperture is not at a position on the position "M" side, that is, if the lens aperture is at the position "A", and then judges whether or not the Av value set by the user (or the value AVD calculated by AE calculation) is the full-aperture value (S.128). If the result at S. 128 is "Y", "0" is set as the number of EE pulses at S.127, and S.125 is entered. This is done because the full-aperture value can be obtained as the aperture value even in the normal automatic exposure mode.

If the result at S.128 is "N", the number of EE pulses is calculated from the following equation (S.129), and S.125 is then entered.

The number of EE pulses=8×(AVD−MND2−1−8%)

Since the EE pulse calculation process for a case where the lens is at the position "A" is executed in the ordinary manner, its detailed description will be omitted.

Figure 8:
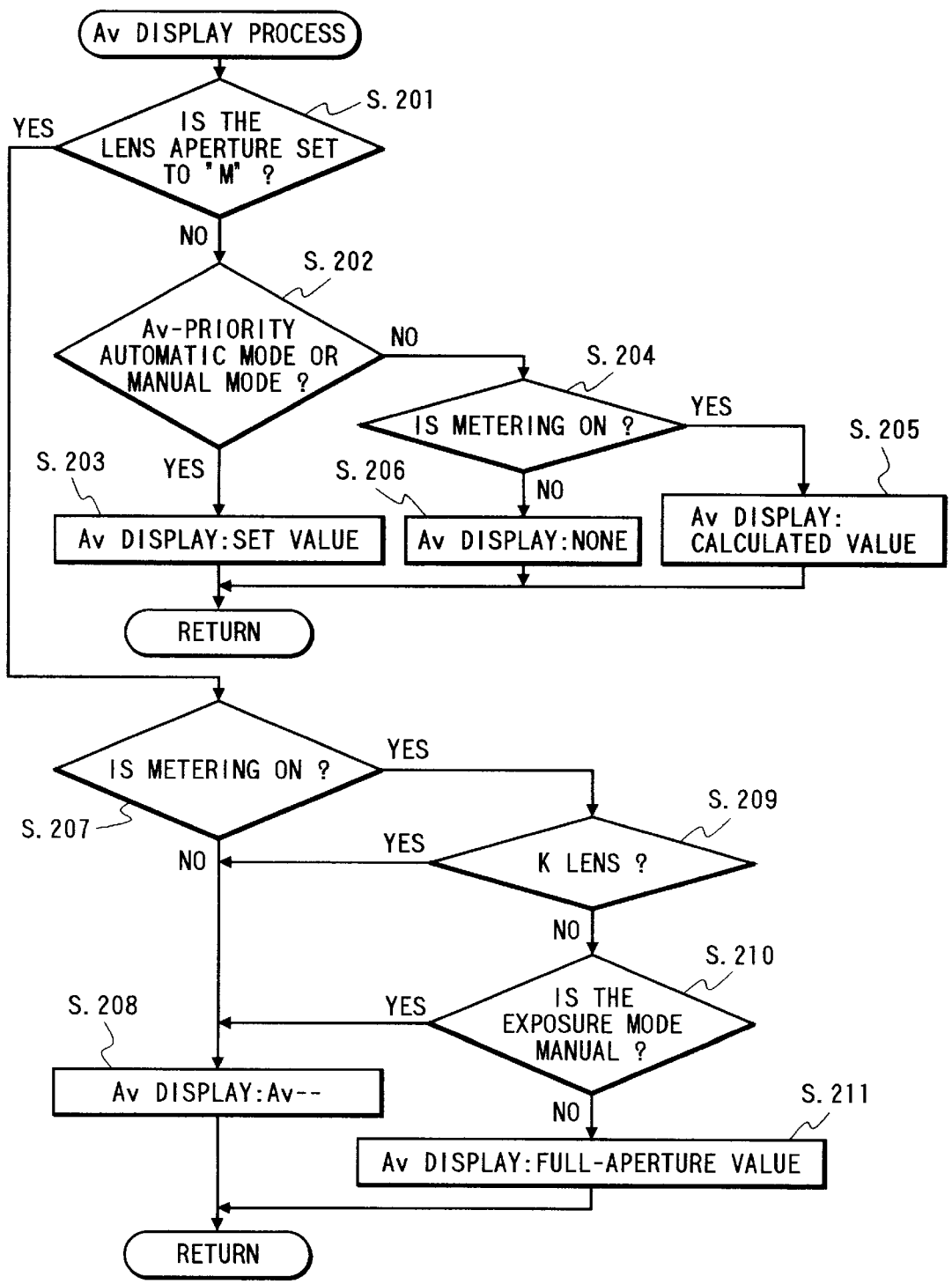
FIG. 8 is a flowchart showing a display process of the single-lens reflex camera according to the invention.

Thereafter, the CPU performs the Av display process at S13. This Av display process is performed according to the flowchart shown in FIG. 8.

First, the CPU judges whether or not the lens aperture is at the position "M" at S. 201. If the lens aperture is at the position "M", the "Y" judgment is made, and it is then judged whether or not the shutter button has been pressed halfway and the metering switch is on (S.207). If the metering switch is judged to be off (the "N" judgment is made) at S.207, "AV--" is displayed as the Av display at the display part 7 (S.208), and a return to the main flow is then performed. If the metering switch is on, it is judged whether or not a K lens is mounted on the camera body 1 (S. 209). If the judgment result at S. 209 is "Y", S.208 is entered.

Thus, in case of the K lens where the full-aperture F No. information is not transmitted to the camera body 1 side, Av display is disabled.

When a lens other than the K lens is mounted on the camera body (when the "N" judgment is made), it is judged whether or not the exposure mode at the camera body 1 side is set to manual (S.210). If the exposure mode at the camera body 1 side is set to manual, the "Y" judgment is made, and S.208 is entered. If the exposure mode at the camera body 1 side is a mode other than manual (if the "N" judgment is made), S.211 is entered, the full-aperture value is indicated for the Av display at the display part 7, and then a return to the main flow is performed. Thus, if the F lens or A lens with full-aperture F No. information is mounted on the camera body 1 and the lens aperture is set to the position "M" and the mode set at the camera body 1 side is the full-aperture Av-priority mode, the full-aperture F No. is displayed at the display part 7. That is, unlike ordinary aperture-priority control, the full-aperture F No. information is displayed at the display part 7.

If the lens aperture is at the position "A" (if the "N" judgment is made) at S.201, it is judged whether or not the mode is set to the Av-priority mode or the manual mode (S.202). If it is judged that the mode is set to the Av-priority mode or the manual mode (if the "Y" judgment is made) at S.202, S.203 is entered, the value set by the user is indicated for the Av display at the display part 7, and then a return to the main flow is performed. If it is judged that the mode is set to the Tv-priority mode, the program mode or the bulb mode (if the "N" judgment is made) at S.202, it is then judged whether or not the metering switch has been turned on (S.204). If the metering switch is on (if the "Y" judgment is made), the return to the main flow is performed upon displaying the calculating value for the Av display at the display part 7 (S.205). If the metering switch is off (if the "N" judgment is made), the return to the main flow is performed without displaying the Av display at the display part 7 (S.206).

After the CPU performs the above display process (S.13), it performs the release check process (S.14). In this release process, it is judged whether or not the shutter has been depressed fully so that photograph has been executed, and it is then judged whether 128 milliseconds elapsed (S.15). If 128 milliseconds have not elapsed (the "N" judgment has been made), the release check is repeated while if the "Y" judgment has been made, S.16 is entered, and it is judged whether or not 10 seconds have elapsed. If 10 seconds have not elapsed (the "N" judgment has been made), the processes from S.8 to S.16 are repeated while if the "Y" judgment is made, S.2 is entered, and the processes from S.2 to S.16 are then repeated.

The above description concerned a new-type camera where the camera body 1 does not have a volume. The following description will concern an old-type camera with a volume.

Figure 9:
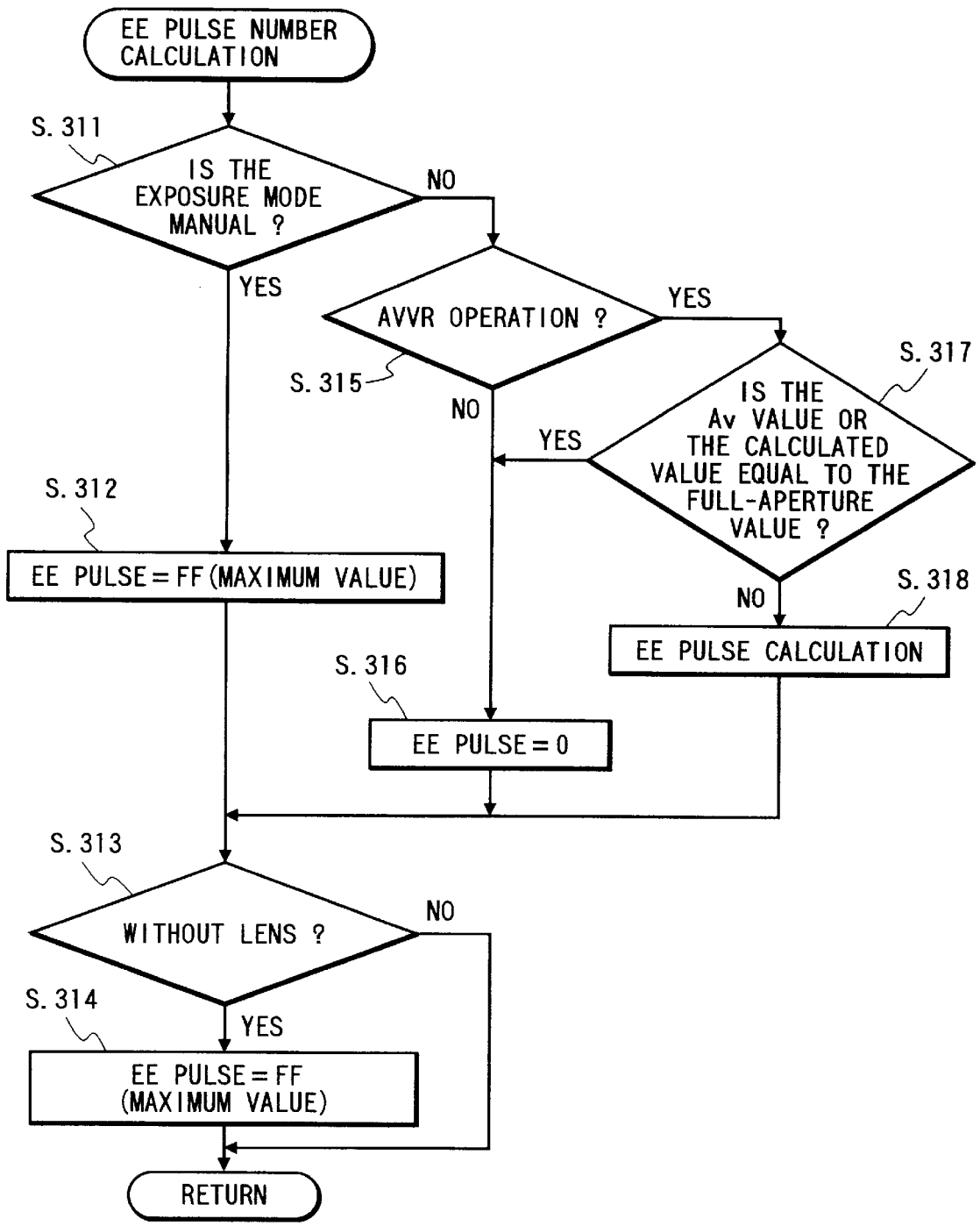
FIG. 9 is a flowchart showing another example of an EE pulse calculation process of the single-lens reflex camera according to the invention.

The F lens, A lens or K lens can also be mounted on the old-type camera. With the old-type camera, the EE pulses are calculated according to the flowchart shown in FIG. 9.

In the EE pulse number calculation process, it is first judged whether or not the exposure mode at the camera body 1 side is manual (S.311). If the "Y" judgment is made at S.311, FF (maximum value) is set as the number of EE pulses. It is then judged whether or not the lens mount 9 is attached onto the camera body 1 (S.313). If it is judged that the lens mount 9 is not mounted onto the camera body 1 (the "Y" judgment is made) at S.313, FF (maximum value) is set as the number of EE pulsed (S.314). A return to the main flow is then performed. If it has been judged that the lens mount 9 is attached onto the camera body 1 at S.313, the return to the main flow is performed upon skipping (S.314).

If the CPU judges that the exposure mode at the camera body 1 side is not manual (makes the "N" judgment) at S.311, it then judges whether or not the volume resistance AVVR has changed (S.315).

If a lens mount 9 for the new F type lens which does not have the linking rod 13 is attached onto the old-type camera body 1, the resistance AVVR of the volume is not changed. It can thus be judged whether or not the lens is one with an aperture linking rod.

If there was no change in resistance AVVR of the volume (if the "N" judgment was made), "0" is set as the number of EE pulses (S.316), and S.313 is entered. If it has been judged that there was a change in resistance AVVR of the volume (if the "Y" judgment was made) at S.315, S.317 is entered, and it is judged whether or not the Av value set by the user (or the value AVD calculated by AE calculation) is the full-aperture value. If the "Y" judgment is made at S.317, S.316 is entered, so that "0" is set as the number of EE pulses, and S.313 is then entered.

If the "N" judgment is made at S.317, the number of EE pulses is calculated with the following equation (S.318), and S.313 is then entered.

The number of EE pulses=8×(AVD−MND2−1−8%)

The other processes are the same and their detailed description will be omitted.

Since the single-lens reflex camera according to the present invention has been arranged as was described above, it provides the advantage that the automatic exposure mode can be selected at the camera body side and photography in the automatic exposure mode can be executed upon forcibly setting the aperture to the full-aperture condition when the full-aperture metering error compensation information cannot be obtained and particularly when information indicating that the aperture will be controlled at the lens side is transmitted from the lens side to the camera body side.

While this invention has been described in conjunction with the preferred embodiments thereof, it will now readily be possible for those skilled in the art to put this application into practice in various other manners.

The present disclosure relates to subject matter contained in Japanese Patent Application No. HEI 9-016198, filed on Jan. 30, 1997, which is expressly incorporated herein by reference in its entirety.

What is claimed is:

1. A single-lens reflex camera with a full-aperture metering means, comprising:
a lens which includes:
an automatic diaphragm means;
a lens mount; and
information transmitting means for transmitting information for full-aperture metering error compensation; and
a camera body which includes:
a lens mount attachment part to which said lens mount of said lens is detachably attached;
information receiving means for receiving the information for full-aperture metering error compensation from said information transmitting means of said lens; and
mode setting means for selecting one of various exposure modes including an automatic exposure mode;
wherein when said information receiving means receives no information for full-aperture metering error compensation from said information transmitting means in a state where said lens is attached to said camera body, said mode setting means enables the automatic exposure mode to be set so that photography is executed with an aperture being forcibly being set to a full-aperture condition.

2. A single-lens reflex camera with a full-aperture metering means, comprising:
a lens which includes:
an automatic diaphragm means;
a lens mount; and
information transmitting means for transmitting information as to whether an aperture is controlled at a lens side of a camera body side; and
a camera body which includes:
a lens mount attachment part to which said lens mount of said lens is detachably attached;
information receiving means for receiving the information as to whether the aperture is controlled at the lens side or the camera body side from said information transmitting means of said lens; and
mode setting means for selecting one of various exposure modes including an automatic exposure mode;
wherein when said information receiving means receives the information that the aperture is controlled at the lens side from said information transmitting means in a state where said lens is attached to said camera body, said mode setting means enables the automatic exposure mode to be set so that photography is executed with an aperture being forcibly set to a full-aperture condition.

3. A single-lens reflex camera as claimed in claim 1 wherein said camera body further includes a display part for conducting a display different from that for normal aperture-priority control when the aperture is forcibly set to the full-aperture condition.

4. A single-lens reflex camera as claimed in claim 1 wherein said camera body further includes means for judging whether said lens mounted on said camera body has a full-aperture F No. information, and means for displaying the full-aperture F No. when said judging means judges that said lens has the full-apertures F No. information and for prohibiting a display of the full-aperture F No. information or displaying information other than a numerical value that signifies the F No. when said judging means judges that said lens has no full-aperture F No. information.

5. A single-lens reflex camera as claimed in claim 2 wherein said camera body further includes a display part for conducting a display different from that for normal aperture-priority control when the aperture is forcibly set to the full-aperture condition.

6. A single-lens reflex camera as claimed in claim 2 wherein said camera body further includes means for judging whether said lens mounted on said camera body has a full-aperture F No. information, and means for displaying the full-aperture F No. when said judging means judges that said lens has the full-aperture F No. information and for prohibiting a display of the full-aperture F No. information or displaying information other than a numerical value that signifies the F No. when said judging means judges that said lens has no full-aperture F No. information.

* * * * *